H. SIMON.
COMBINATION SQUARE.
APPLICATION FILED JAN. 7, 1920.

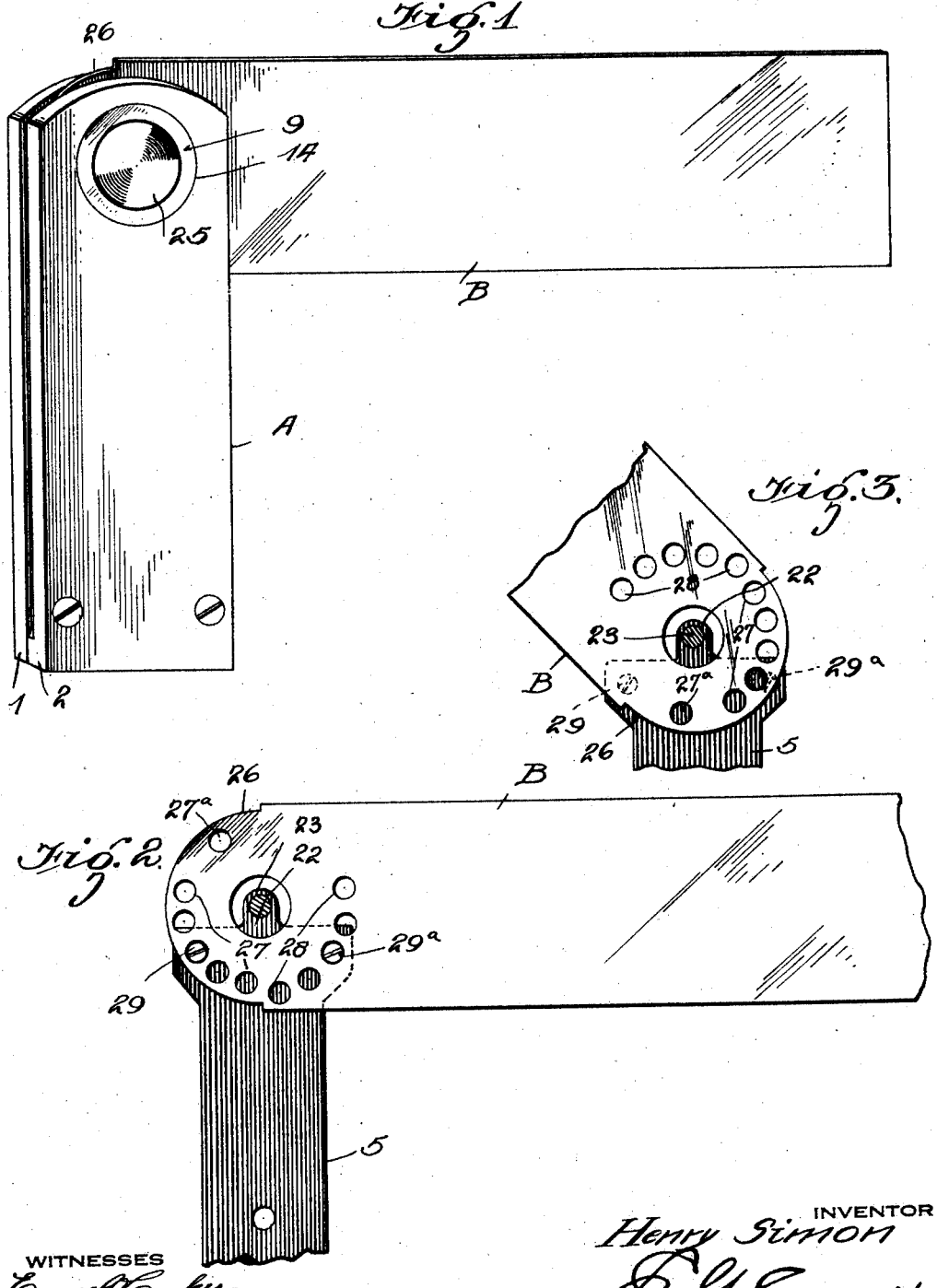

1,388,612.

Patented Aug. 23, 1921.
3 SHEETS—SHEET 2.

WITNESSES

INVENTOR
Henry Simon
BY
ATTORNEY

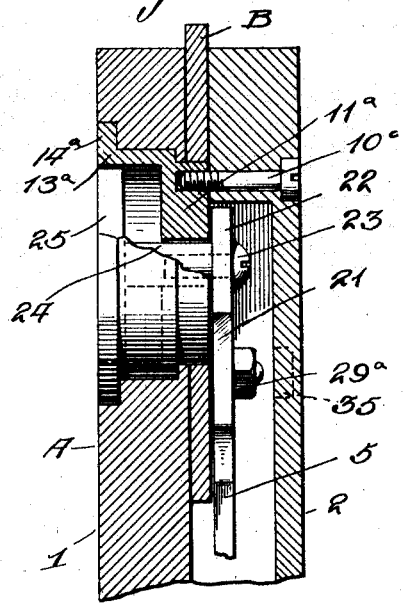
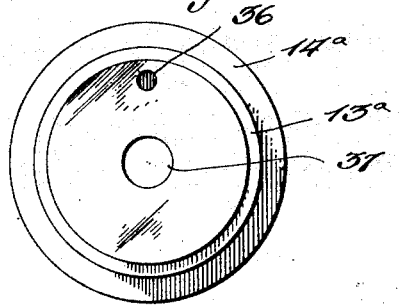
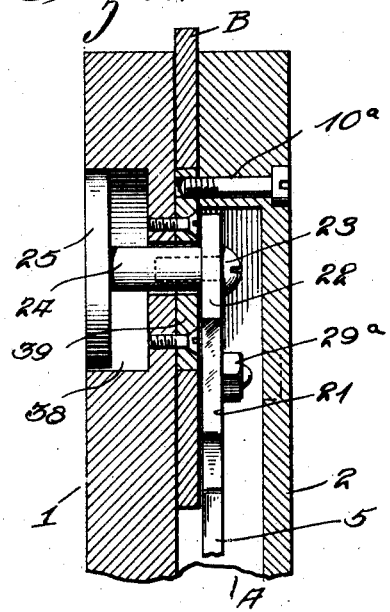
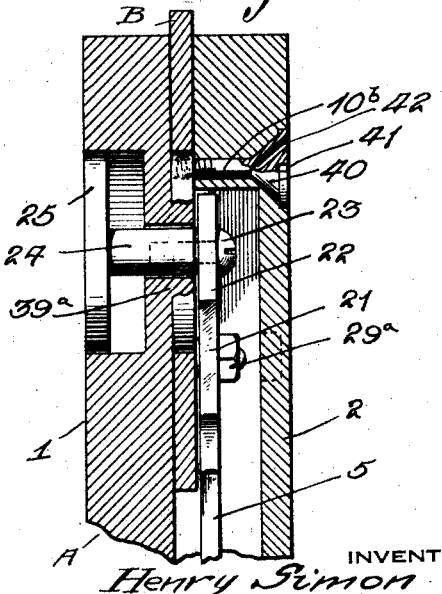

UNITED STATES PATENT OFFICE.

HENRY SIMON, OF LAGUNA BEACH, CALIFORNIA, ASSIGNOR OF ONE-HALF TO JOSEPH W. SKIDMORE, OF LAGUNA BEACH, CALIFORNIA.

COMBINATION-SQUARE.

1,388,612.  Specification of Letters Patent.  Patented Aug. 23, 1921.

Application filed January 7, 1920. Serial No. 349,916.

*To all whom it may concern:*

Be it known that I, HENRY SIMON, a citizen of the United States, residing at Laguna Beach, in the county of Orange and State of California, have invented a new and useful Combination-Square, of which the following is a specification.

This invention has reference to combination squares, and its object is to provide a tool which may be changed at will from an ordinary try square into a miter or octagon square, or may be used as a bevel, and which will be as efficient in one use as in another. The invention is an improvement upon Letters Patent No. 1,308,815, granted to me July 8, 1919.

While retaining certain of the features of the instrument described in said Letters Patent, the invention includes certain other features whereby its usefulness is increased, the operation of the instrument is eased, the assembly of the instrument is simplified, and the manufacture of the instrument is rendered more positive and accurate, all of which will become apparent from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings,

Figure 1 is a perspective view of the square with the blade at right angles to the handle.

Fig. 2 is a view similar to Fig. 1 but limited to the blade and retaining spring, other parts being omitted.

Fig. 3 is a fragmentary view of the structure shown in Fig. 2 but with the blade moved toward the opposite edge of the spring.

Fig. 9 is a section on an enlarged scale of a slightly modified form of the invention.

Fig. 10 is an elevation of a portion of the structure shown in Fig. 9.

Figs. 11 and 12 are sectional views showing other modifications of the invention.

Figure 4:
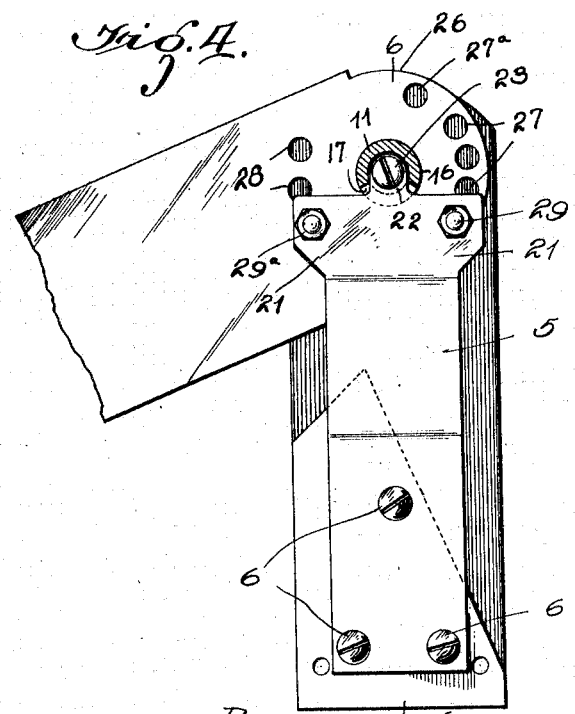
Fig. 4 is a view of the square with the blade moved into acute angular relation to the handle and omitting a portion of the body or handle of the square, the showing being that of the opposite face of the square from the showing of Fig. 1.
Figure 5:
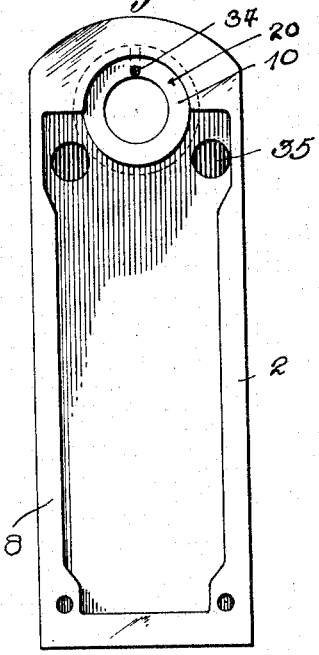
Fig. 5 is an inner face view of the portion of the handle omitted in Fig. 4.
Figure 6:
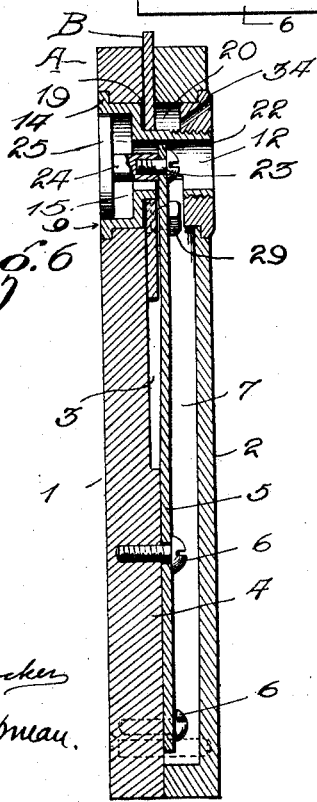
Fig. 6 is a section on the line 6—6 of Fig. 4.
Figure 7:
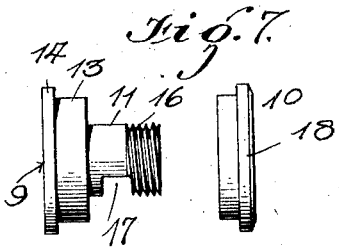
Fig. 7 is an elevation of the pivot bolt and nut separate from the square.
Figure 8:
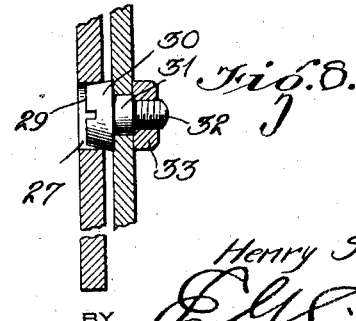
Fig. 8 is a detail section of the locking stud for temporarily holding the blade and spring together.

Referring to the drawings, there is shown a handle A and a blade B, these constituting the two parts ordinarily employed in try squares and bevels. The handle is composed of two members 1 and 2, preferably, although not necessarily, made of metal such as aluminum or aluminum alloy, although, of course, the handle may be made of other materials, including wood. The inner face of the handle member 1 is recessed or cut away as indicated at 3, leaving at one end of the handle member a shoulder 4, the recess 3 receiving the pivot end of the blade B. Fast to the shoulder 4 is one end of a flat spring 5 held to the shoulder by screws 6. The inner face of the handle member 2 is formed with a longitudinal recess 7 of sufficient size to receive certain parts of the mechanism of the tool, and surrounding the recess 7 the handle member 2 has a flange 8, whereby the recess 7 is closed in up to the shoulder 4.

At the end of the handle A, remote from that to which the spring 5 is secured, there is a through axial passage traversed from one end to the other by a screw member 9 to which is applied a nut 10. The screw member 9 is, in the structure shown in Fig. 1 and associated figures, provided with an axial stem 11 having a central bore 12 and an enlarged head portion 13 with an outstanding peripheral flange 14 remote from the stem 11. The head 13 is counterbored, as shown at 15, while the end of the stem 11 remote from the head 13 has exterior screw threads 16, the remainder of the stem between the screw threads and the head 13 being plain. Extending through the stem 11 is a slot 17 terminating short of the head 13.

The nut 10 is adapted to the threaded end 16 of the stem 11 and is provided at one end with an outstanding peripheral flange 18.

The passage receptive of the screw member 9 and nut 10 is a two-part passage, one part 19 of which is of a size to snugly receive the head 13 of the screw member 9 and is located in the handle member 1, while in the handle member 2 there is a similar passage 20 for receiving the nut 10, and both of these passages 19 and 20 are rabbeted or otherwise shaped to seat the respective flanges 14 and 18.

The spring 5 is located between the handle members 1 and 2 and normally lies against the blade B. That end of the spring 5 toward the blade end of the tool is expanded laterally into ears 21, the expansion being about equal on opposite sides of the longitudinal center line of the spring. The end of the spring with the ears 21 has a centrally located extension or tongue 22 entering the bore 12 of the stem 11 through the slot 17. The tongue 22 is bored or perforated to pass a screw 23 entering a stem 24 carried centrally by a push button 25 adapted to the counterbore 15 and of such thickness as to be capable of movement in the counterbore axially thereof without escaping therefrom. The counterbore 15 is of a length to permit sufficient movement of the push button 25, together with the corresponding end of the spring 5, and the slot 17 is of appropriate width to permit such movement of the spring and push button.

What may be termed the butt end of the blade B is mounted on the smooth portion of the stem 11 to turn snugly yet freely thereabout and such butt end of the blade is rounded, as shown at 26 concentrically with the axis of rotation represented by the longitudinal center line of the screw member 9. The butt end of the blade B is provided with a substantially continuous series of perforations divided into two groups 27 and 28, which may be equal in the number of perforations, with each group concentric with the axis of rocking of the blade but one group, say the group 28, of slightly greater radius than the other group. The ears or enlargements 21 of the spring 5, on opposite sides of the longitudinal center line of the spring, carry stop members 29 and 29ᵃ each in the form of a slightly tapering head 30 on one end of a stem 31 terminating in a screw threaded extension 32 to which a nut 33 is applied, the stem 31 passing through the spring 5 and the nut 33 applied to the stem 32 clamping the stop or stud 29 to the spring. The studs 29 and 29ᵃ are adapted to the respective series 27 or 28 of the perforations through the blade and each stud is properly located to engage in any one of its own series of perforations. Because of the slight difference in the radius of curvature of the two series of perforations, the location of the studs 29 and 29ᵃ agreeing with such difference, neither stud will engage in the other series of perforations than the one to which it belongs. For this reason, movement of the blade B in a direction and to an extent bringing a stud into the zone of the perforations individual to the other stud, will not cause an unintentional locking of the blade by the said other stud. Beyond the series 27 of perforations is another perforation 27ᵃ so located as to be entered by the stud 29 when the blade B is in substantial alinement with the handle. This is to hold the blade alined with the handle for storage or other similar purpose.

The normal tendency of the spring 5 is to move the studs 29 and 29ᵃ into appropriate ones of the perforations 27 and 28, thus holding the blade B, on opposite sides of its axis of rocking, firmly in position for try square purposes or in other than the right-angular position. When it is desired to change the position of the blade B, pressure is applied upon the push button 25, thus moving the spring 5 against its normal tendency to an extent carrying the heads 30 out of the perforations 27 and 28, thus freeing the blade B so that it may be rocked in the desired direction to the desired extent. On reaching the desired position, pressure upon the push button 25 is relieved, whereupon the spring 5 returns to the first or locking position with the head 30 of the studs 29 or 29ᵃ, or both of these heads, entering corresponding perforations in the blade, thereby positively locking the blade against further movement in either direction until the push button is again manipulated.

The tightness of the engagement of the handle with the blade is determined by the tightness of screwing the nut 10 on the stem 11. This may be performed in various ways, and in the structure shown in Fig. 1 and associated figures a very simple arrangement for tightening or loosening the nut 10 is indicated. To one side of the axis of the nut 10, the nut is provided with a passage 34, preferably at an angle to the axis of rotation of the nut and of a size to receive a nail, such for instance as a finishing nail, which will serve as a lever readily manipulated to turn the nut with considerable force and which is a device practically always available to a person using a try square or bevel.

Because of the presence of the nuts 33 and to avoid interference of these nuts with the movements of the spring 5, corresponding portions of the inner face of the wall of the handle member 2 have countersinks 35 to receive so much of the nuts as may be necessary when the spring 5 is moved to clear the heads 30 from the perforations or sockets 27 and 28.

In Figs. 9, 10, 11 and 12, there are shown somewhat modified forms of the pivot assembly for the blade, the results, however, being similar to those obtained with the structure of Fig. 1 and associated figures.

In Fig. 9, there is provided a cup-like sleeve 13ª with a marginal flange 14ª and a pivotal boss 11ª at the closed end of the cup receiving a screw 10ª for securing the two members 1 and 2 of the handle A together, this screw being to one side of the pivotal axis of the blade. A push button 25 with a stem 24 arranged in the pivotal axis and connected to the spring 5 by a screw 23 is substantially the same as that shown in Fig. 1 and associated figures. The substantially closed end of the cup 13ª has a threaded receptacle 36 (Fig. 10), for the screw 10ª and a passage 37 is provided through the substantially closed bottom of the cup 13ª for the stem 24. Since in the structure shown, in Fig. 9, the stem 11 is omitted, the slot 17 for the reception of the tongue 22 is not found in Fig. 9.

In Fig. 11, the cup 13ª is wholly omitted and the push button 25 is located in a cavity 38 formed directly in the member 1 of the handle. A pivot disk or flange 39 is either formed separately from and secured in any suitable manner, as by screws, as shown, to the handle member 1, as may be considered as indicated in Fig. 11, or a flange 39ª is formed integrally with the handle member 1, as indicated in Fig. 12. The screw 10ª is employed in the structure shown in Fig. 11 to hold the corresponding end of the handle member 2 to the pivot disk 39, and so to the handle member 1 in the showing of Fig. 11, while in Fig. 12 a screw 10ᵇ with a bevel head 40 serves the same purpose and is provided with a screw slot 41 and a socket 42 for the application of a screw driver or of a nail to clamp the blade B between the two handle members 1 and 2, as in the structure of Fig. 1 and associated figures, where it is desired to firmly hold the blade B in different bevel positions, this same feature being accomplished in the structure of Figs. 9 and 10 by the screw 10ª.

In the structure of Fig. 12, the push button 25 with its stem 24 is the same as in the structure of Fig. 9, and in both Figs. 11 and 12, the cavity or receptacle for the push button 25 is formed directly in the handle member 1, which may be of metal.

In the structure of Fig. 1 and associated figures, the slot 17 of the pivot screw member 9 is spaced sufficiently from the head 13 to leave the tubular stem 11 intact to an extent sufficient to provide an unbroken pivotal support for the blade B.

The spring 5 is held to the handle section 1 by three screws 6 with the holes in the spring passing the screws slightly enlarged in order to permit lateral adjustment of the spring in assembling.

The studs 29 and 29ª, being in the form of cap screws with taper heads each provided with a stout stem portion of a length corresponding to the thickness of the spring and terminating in the threaded portion for the reception of the nut 33, permit a firm connection between the stud and the spring without causing spread of the metal of the spring and displacement of the studs by heavy blows such as are needed in a riveting operation, and also provide for the ready replacement of the studs should such operation become necessary. Moreover, there is a reduction in wear between the holes 27 and 27ª and the studs 29 and 29ª, due to the fact that neither stud enters more than one series of holes 27 or 28, the two studs being placed far apart on the spring 5. Because of the long leverage thus obtained, the engagement of a stud with the blade is entirely sufficient to hold the blade rigidly and with great accuracy in any fixed angle position, beyond the possibility of movement. Very little wear occurs and this is automatically taken up by the taper construction of the screw heads 30. The arrangement is such that the blade may be swung about over the entire wide range of bevel adjustment without encountering any obstacle, even though, on account of the length of the arc of holes, some of them come at times over one or the other of the studs, but since the end faces of the studs are practically flat, even a very slight variation in the radius of the two arcs of holes, prevents any engagement, and the blade may therefore run as smoothly on the bevel side as if there were no receptacles there present. The taper of the studs 29 and 29ª is slightly different from the holes 27 and 28, so that the studs will seat firmly in the holes and sufficiently deep therein to insure firm engagement, this being due to the fact that the outer end of each head 30 is smaller than the respective hole 29 or 29ª, while the spring moves through a slight arc in engaging with and disengaging from the blade. This also avoids the necessity of reaming the holes to accurately fit the studs, since it is possible to bore or stamp the stud-receiving holes in the blade without reaming them, although this does not preclude the operation of reaming, but the taper of the reamer used should have less pitch than the taper of the stud heads 30.

The outer face of the push button 25 is normally flush with the front face of the handle. The nut 10 may be flush with or project slightly from the opposite face of the handle, since a small projection is immaterial.

The perforations 27, 27ª and 28 have been described as though bored or punched entirely through the material of the blade, but it will be understood that by the term perforations it is intended to cover not only openings extending entirely through the material of the blade but sockets or seats of less depth than the thickness of the blade but acting functionally in the same manner.

What is claimed is:

1. In a combination square having a movable blade, automatic blade-arresting means overlapping one face of the blade, a push piece having an accessible portion movable toward and from the opposite face of the blade and capable of transmitting disengaging forces upon the blade-arresting means, and means for frictionally clamping the blade in various positions of adjustment.

2. A combination square comprising a two part handle and a blade mounted at one end between the two parts of the handle near one end of the latter, pivotal means for the blade traversing both parts of the handle and the blade, means for moving the two parts of the handle toward each other to clamp the blade, and means separate from the clamping means for locking the handle in different positions of adjustment, the locking means being provided with manipulating means in the pivotal axis of the blade whereby to disconnect the locking means from the blade by pressure exerted from the exterior of the handle along said pivotal axis.

3. A combination square comprising a handle formed with a slot at one end, a blade rockably mounted in the slot, means for positively arresting the blade at predetermined angles and located to one side of the slot in the handle, means for disengaging the arresting means and located to the opposite side of the slot in the handle, and means for producing and increasing frictional engagement between the blade and handle.

4. A combination square comprising a handle, a blade pivoted to the handle, said handle comprising two opposed parts, means for locking the blade in predetermined angular positions to the handle, a pivotal support for the blade having manipulating means therein responsive to forces exerted in the axis of movement of the blade, means associated with the pivotal support for moving the two parts of the handle into clamping relation to the blade, and means for locking the blade in predetermined angular positions and responsive to the manipulating means movable in the axis of rocking of the blade.

5. In a square, a handle, a blade carried by the handle and provided with series of perforations or sockets arranged in two arc-shaped groups about the same axis, with one group having a slightly different radius from the other group, a leaf spring with separated studs each situated to engage in the perforations or sockets of a respective group thereof but out of operative relation to the other group, and means for actuating the spring in a direction to move the studs out of engaging relation with the groups of perforations or sockets.

6. In a square, a handle, a blade carried by the handle and provided with series of perforations or sockets arranged in two arc-shaped groups about the same axis, with one group having a different radius from the other group, a leaf spring with separated studs each situated to engage in the perforations or sockets of a respective group thereof but out of operative relation to the other group, and means for actuating the spring in a direction to move the studs out of engaging relation with the groups of perforations or sockets, the blade having another perforation or socket in the path of one of the studs and spaced from a respective one of the groups of perforations or sockets to be engaged by the corresponding stud when the blade and handle are substantially in alinement.

7. In a square, a handle, a blade pivotally mounted at one end in the handle and provided with a series of perforations or sockets arranged about the pivotal axis and divided into two groups, one of which constitutes a continuation of the other upon a different radius, latch studs, one for each group of perforations or sockets and individual thereto, and means for moving the studs out of engagement with the blade to permit the adjustment of the latter into different predetermined angular positions.

8. In a square, a handle, a blade pivotally mounted at one end in the handle and provided with a series of perforations or sockets arranged about the pivotal axis and divided into two groups, one of which constitutes a continuation of the other upon a different radius, latch studs, one for each group of perforations or sockets and individual thereto, and means for moving the studs out of engagement with the blade to permit the adjustment of the latter into different predetermined angular positions, said blade having an additional perforation or socket in position to match one of the studs when the blade and handle are in substantial alinement.

9. A square comprising a handle, a blade pivotally mounted in the handle and capable of movement into different angular relations to the handle, said blade having series of perforations or sockets arranged about its pivotal axis with the series differing in radial arrangement with respect to the pivotal axis of the blade, and a plurality of holding means for the blade each individual to a respective series of sockets whereby no one of the perforations or sockets will be engaged by more than one of the holding means at any time.

10. A combination square comprising a handle, a pivotal member carried by the handle, a blade mounted on the pivotal member to turn thereon and provided with a circular series of perforations or seats having the axis of the pivotal member as the axis of the series of perforations or seats with the radius of curvature of a portion of the perforations differing from that of the rest of the perforations, a leaf spring secured within the handle and extending into the longitudinal axis of the pivotal member, a manipulating member carried by the spring in the axis of the pivotal member and accessible from the exterior of the blade at a point corresponding to the pivotal axis, and locking studs carried by the spring and individual to the respective series of perforations or sockets with the separation and location of the studs such as to avoid the engagement of a stud in any perforation or socket of the series of sockets not individual thereto.

11. In a combination square, a handle, a blade carried thereby and pivoted thereto, said blade having perforations or sockets arranged about its pivotal axis in groups of different radii, a spring secured at one end in the handle and at the other end overlapping the blade, spaced studs carried by the end of the spring remote from that secured to the handle and each individual to a respective group of perforations or sockets whereby to avoid engaging any perforation or socket of the group to which it is not individual, and manipulating means for the spring accessible from the exterior of the handle.

12. In a combination square, a handle, a blade carried thereby and pivoted thereto, said blade having perforations or sockets arranged about its pivotal axis in groups of different radii, a spring secured at one end in the handle and at the other end extending across the pivotal axis of the blade, spaced studs carried by the end of the spring remote from that secured to the handle and each individual to a respective group of perforations or sockets whereby to avoid engaging any perforation or socket of the group to which it is not individual, and manipulating means for the spring accessible from the exterior of the handle in the pivotal axis of the blade, said spring having ears on opposite sides carrying the studs whereby to provide corresponding separation of the studs.

13. In a combination square, a handle, a blade pivoted in the handle and provided with perforations or sockets arranged about the axis of movement of the blade in the handle, a spring fast at one end in the handle and at the other end being adjacent to the pivot of the blade, and studs carried by the spring in position to engage the perforations or sockets in the blade, each stud comprising a taper head and a stem passed through the spring and carrying a nut on the end remote from the head, whereby to secure the stud to the spring.

14. In a combination square, a handle, a blade pivoted in the handle and provided with perforations or sockets arranged about the axis of movement of the blade in the handle, a spring fast at one end in the handle and at the other end being adjacent to the pivot of the blade, and studs carried by the spring in position to engage the perforations or sockets in the blade, each stud comprising a taper head and a stem passed through the spring and carrying a nut on the end remote from the head, whereby to secure the stud to the spring, and the taper of the head of the stud being such that the head will not bind in the perforation or socket.

15. In a combination square, a handle, a blade pivotally mounted in the handle, and a pivot member for the blade traversing the handle and comprising a headed portion with a screw stem projecting therefrom and constituting the pivot for the blade, and a nut applied to the screw stem and engaging the handle, said nut having a passage therein angularly related to the longitudinal axis of the screw stem for the reception of a nail to constitute a manipulating member for the nut.

16. A combination square comprising a handle, a pivotal member carried by the handle near one end thereof, said pivotal member comprising a hollow head and a hollow axial stem screw threaded at the end remote from the head and between the screw threaded end and head provided with a slot opening to the interior of the stem, a nut adapted to the threaded end of the stem, a spring within the handle entering the stem through the slot therein, a push button fast to the end of the spring entering the stem and provided with a manipulating end housed in the hollow head of the pivotal member, and studs carried by the spring adjacent to the blade, said blade having perforations or sockets for receiving the studs.

17. A combination square comprising a handle, a pivotal member carried by the handle near one end thereof, said pivotal member comprising a hollow head and a hollow axial stem screw threaded at the end remote from the head and between the screw threaded end and head provided with a slot opening to the interior of the stem, a nut adapted to the threaded end of the stem, a spring within the handle entering the stem through the slot therein, a push button fast to the end of the spring entering the stem and provided with a manipulating end housed in the hollow head of the pivotal member, and studs carried by the spring adjacent to the blade, said blade having perforations or sockets for receiving the studs, and the perforations in the blade forming a continuous series with the pivotal axis of the blade as a center and the perforations formed into two groups of different radial distances from the pivotal axis, the studs being similarly placed to be individual to the respective groups.

18. In a combination square having a movable blade, an axial member containing at one end manipulating means for automatic blade-arresting means, and at the opposite end having manipulating means for frictional blade clamping means.

19. The combination with a handle and a blade pivotally mounted therein, of a pivot member or sleeve traversing the blade and handle, clamping means for the handle to frictionally hold the handle and blade together in adjusted positions of the blade, and coacting latch means distinct from the clamping means and traversed by the pivotal axis of the blade for holding the blade positively in set-angle positions.

20. In a tool, a pivoted blade having a plurality of sets of receptacles located at different radial distances from the pivotal axis, and locking means for the blade individual to the different sets of receptacles.

21. A tool provided with a pivoted member having engaging means, and sets of receptacles in substantially one plane for the engaging means and also located and constructed to prevent the engaging means of either set from entering the receptacles of the other set.

22. A tool provided with a pivoted blade having means for bevel adjustments and having automatic set-angle adjustments, and means for automatically locking the blade in substantial alinement with the handle.

23. In a combination square having a movable blade, positive blade-arresting means, frictional blade-clamping means, and manipulating means for the positive blade-arresting means, all acting in a direction transverse to the face of the blade.

24. In a combination square having a rockable, automatically arrestable, frictionally clampable blade, and means located to operate through the pivotal bearing of the blade for transmitting both the clamping forces and the disengaging forces with the latter acting upon the automatic arresting means.

In testimony that I claim the foregoing as my own, I have hereto affixed my signature in the presence of two witnesess.

HENRY SIMON.

Witnesses:
 AUGUST ALBERT WOHLFARTT,
 THOMAS JERY SAYLES.